«12» United States Patent
Hayes et al.

(10) Patent No.: US 7,460,076 B2
(45) Date of Patent: Dec. 2, 2008

(54) MOBILE WIRELESS COMMUNICATIONS TERMINALS AND WIRELESS COMMUNICATIONS CARDS FOR USE WITH AN ELECTRONIC DEVICE

(75) Inventors: Gerard J. Hayes, Wake Forest, NC (US); Curtis W. Thornton, Raleigh, NC (US); Brian F. Mellage, Raleigh, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 210 days.

(21) Appl. No.: 11/485,607

(22) Filed: Jul. 12, 2006

(65) Prior Publication Data

US 2007/0285320 A1    Dec. 13, 2007

Related U.S. Application Data

(60) Provisional application No. 60/813,133, filed on Jun. 13, 2006.

(51) Int. Cl.
*H01Q 1/24* (2006.01)
*H01Q 1/38* (2006.01)
*H01Q 21/00* (2006.01)

(52) U.S. Cl. .............................. 343/702; 343/700 MS; 343/853

(58) Field of Classification Search .......... 343/700 MS, 343/702, 853, 860, 880, 893
See application file for complete search history.

(56) References Cited

U.S. PATENT DOCUMENTS

| 6,295,031 | B1* | 9/2001 | Wallace et al. .............. 343/702 |
| 6,518,937 | B2 | 2/2003 | Fang |
| 6,531,985 | B1 | 3/2003 | Jones et al. |
| 6,545,643 | B1 | 4/2003 | Sward et al. |
| 6,570,538 | B2 | 5/2003 | Vaisanen et al. |
| 6,870,733 | B2 | 3/2005 | Castell et al. |
| 7,037,119 | B2* | 5/2006 | Collins ........................ 439/131 |
| 7,167,726 | B2* | 1/2007 | Ghosh et al. ................ 455/557 |
| 2001/0006902 | A1 | 7/2001 | Ito |
| 2004/0125039 | A1 | 7/2004 | Sasaki et al. |
| 2006/0077103 | A1 | 4/2006 | Hayes |

FOREIGN PATENT DOCUMENTS

| EP | 1 168 487 A2 | 1/2002 |
| GB | 2 391 435 A | 2/2004 |
| JP | 2002368644 A | 12/2002 |
| WO | WO 2002/35643 A2 | 5/2002 |

(Continued)

OTHER PUBLICATIONS

International Search Report for PCT Application No. PCT/US2007/000297, mailed Jun. 27, 2007.

(Continued)

*Primary Examiner*—Shih-Chao Chen
(74) *Attorney, Agent, or Firm*—Myers Bigel Sibley & Sajovec, P.A.

(57) ABSTRACT

A wireless communications card for use with an electronic device includes a frame and an antenna system. The frame is configured for removable installation in the electronic device. The antenna system includes first and second antennas each integral with the frame. At least one of the first and second antennas is selectively movable relative to the other between a first antenna configuration and a second antenna configuration.

22 Claims, 12 Drawing Sheets

FOREIGN PATENT DOCUMENTS

WO　　WO 2004/097977 A1　　11/2004

OTHER PUBLICATIONS

"ExpressCard," http://en.wikipedia.org/wiki/ExpressCard, Jun. 9, 2006, 1 page.

"PC card," http://en.wikipedia.org/wiki/PCMCIA, Jun. 9, 2006, 3 pages.

"Merlin V620 Generic Wireless PC Card Modem," http://www.novatelwireless.com/products/merlin/merlin-v620.html, Jul. 26, 2006, 2 pages.

* cited by examiner

MOBILE WIRELESS COMMUNICATIONS TERMINALS AND WIRELESS COMMUNICATIONS CARDS FOR USE WITH AN ELECTRONIC DEVICE

RELATED APPLICATION(S)

The present application claims the benefit of and priority from U.S. Provisional Patent Application Ser. No. 60/813,133, filed Jun. 13, 2006, the disclosure of which is incorporated herein by reference in its entirety.

BACKGROUND OF THE INVENTION

The present invention relates to radio communications apparatus, and more particularly, to radio antenna apparatus.

Computing devices, such as laptop computers, notebook computers, pocket PCs, personal digital assistants (PDAs), gaming devices, and the like, now commonly possess wireless communications capabilities. For example, many laptop and notebook computers now incorporate radio communications circuitry configured to communicate with, for example, WiFi networks and/or public cellular networks. Such circuitry may be integrated in the computer and/or may be provided in a circuit assembly, such as a PC card or a USB adapter, which is plugged into the computer. Similar cards and/or adapters may be used with other electronic devices, such as PDAs and computer peripherals (e.g., printers, scanners, and the like).

Such wireless communications circuitry may be configured to connect to an external radio antenna and/or may include an integrated radio antenna. Some PC cards, for example, include an external antenna jack to which a rigid antenna and/or an antenna cable may be attached. A number of PC cards are also available which include an internal antenna without an external antenna connection. For example, a GC-89 GPRS/WiFi PCMCIA card marketed by Sony Ericsson Mobile Communications, Inc., includes an internal antenna that is positioned within a housing proximate an end of the card. Many WiFi cards have a similar internal antenna configuration.

Constraints on the size and positioning of such internal antennas may cause antenna performance to be significantly degraded. For example, when a wireless PC card is mounted in a notebook computer, the antenna of the card may be blocked or shadowed by the LCD screen of the computer. This blockage or shadowing can result in a reduction of gain in certain directions. In addition, when the computer is in a normal operating position, the polarization of the antenna may be dominant in a horizontal plane. However, in certain fringe areas of low signal coverage, signal polarization may be dominantly vertical. The resulting polarization mismatch may lead to significant performance degradation.

SUMMARY OF THE INVENTION

According to embodiments of the present invention, a wireless communications card for use with an electronic device includes a frame and an antenna system. The frame is configured for removable installation in the electronic device. The antenna system includes first and second antennas each integral with the frame. At least one of the first and second antennas is selectively movable relative to the other between a first antenna configuration and a second antenna configuration.

According to some embodiments, the first antenna is internal to the frame and the second antenna is mounted on an extension member that is movably mounted on the frame such that the extension member and the second antenna can be selectively moved between a retracted position adjacent the frame and a second position extended from the frame. According to some embodiments, the extension member is pivotally mounted on the frame.

According to some embodiments of the present invention, a mobile wireless communications terminal includes a housing and an antenna system. The antenna system includes first and second antennas each integral with the housing. At least one of the first and second antennas is selectively movable relative to the other between a first antenna configuration and a second antenna configuration.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION OF EXEMPLARY EMBODIMENTS

The present invention now will be described more fully with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

As used herein, the term "comprising" or "comprises" is open-ended, and includes one or more stated features, integers, elements, steps, components or functions but does not preclude the presence or addition of one or more other features, integers, elements, steps, components, functions or groups thereof. As used herein, the term "and/or" includes any and all combinations of one or more of the associated listed items.

As used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation.

The terminology used herein is for the purpose of describing particular embodiments only and is not intended to be limiting of the invention. As used herein, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. Well-known functions or constructions may not be described in detail for brevity and/or clarity.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Furthermore, "coupled" or "connected" as used herein may include wirelessly coupled or connected.

As used herein, a "wireless communication terminal" or a "wireless terminal" refers to a communication terminal configured to communicate (i.e., receive and/or transmit communication signals) over a wireless interface. Examples of wireless terminals include, but are not limited to, a cellular telephone, personal data assistant (PDA), pager, and/or a computer (e.g., laptop or notebook computer) that is configured to communicate data over a wireless communication interface that can include a cellular telephone interface, a Bluetooth interface, a wireless local area network interface (e.g., 802.11), and/or another RF communication interface. Wireless terminals may be configured to communicate over the wireless interface with, for example, a cellular network, a satellite network, a wireless local area network (WLAN), and/or another wireless communication terminal.

As used herein, "mobile terminals" may be portable, transportable, installed in a vehicle (aeronautical, maritime, or land-based), or situated and/or configured to operate locally and/or in a distributed fashion at any other location(s) on earth and/or in space.

Figure 1:
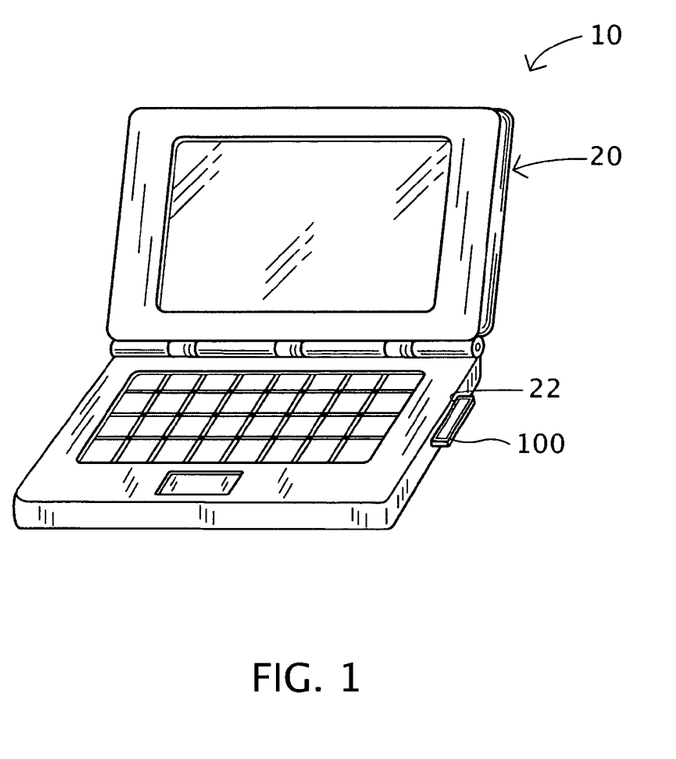
FIG. 1 is a perspective view of a wireless terminal according to embodiments of the present invention.

With reference to FIG. 1, a wireless terminal 10 according to embodiments of the present invention is shown therein. The wireless terminal 10 includes an electronic device 20 and a wireless communications card 100 according to embodiments of the present invention. The electronic device 20 has a slot 22 to receive the card 100. In the illustrated embodiment, the electronic device 20 is a laptop computer; however, wireless communications cards in accordance with the present invention may be used with other types of electronic devices such as PDAs. Also, in the illustrated embodiment, the slot 22 is a PCMCIA standard compliant PC Card slot. In accordance with other embodiments as discussed below, the slot 22 is a PCMCIA standard compliant ExpressCard slot. Alternatively, the slot 22 may be a configured to comply with another public or proprietary standard.

Figure 2:
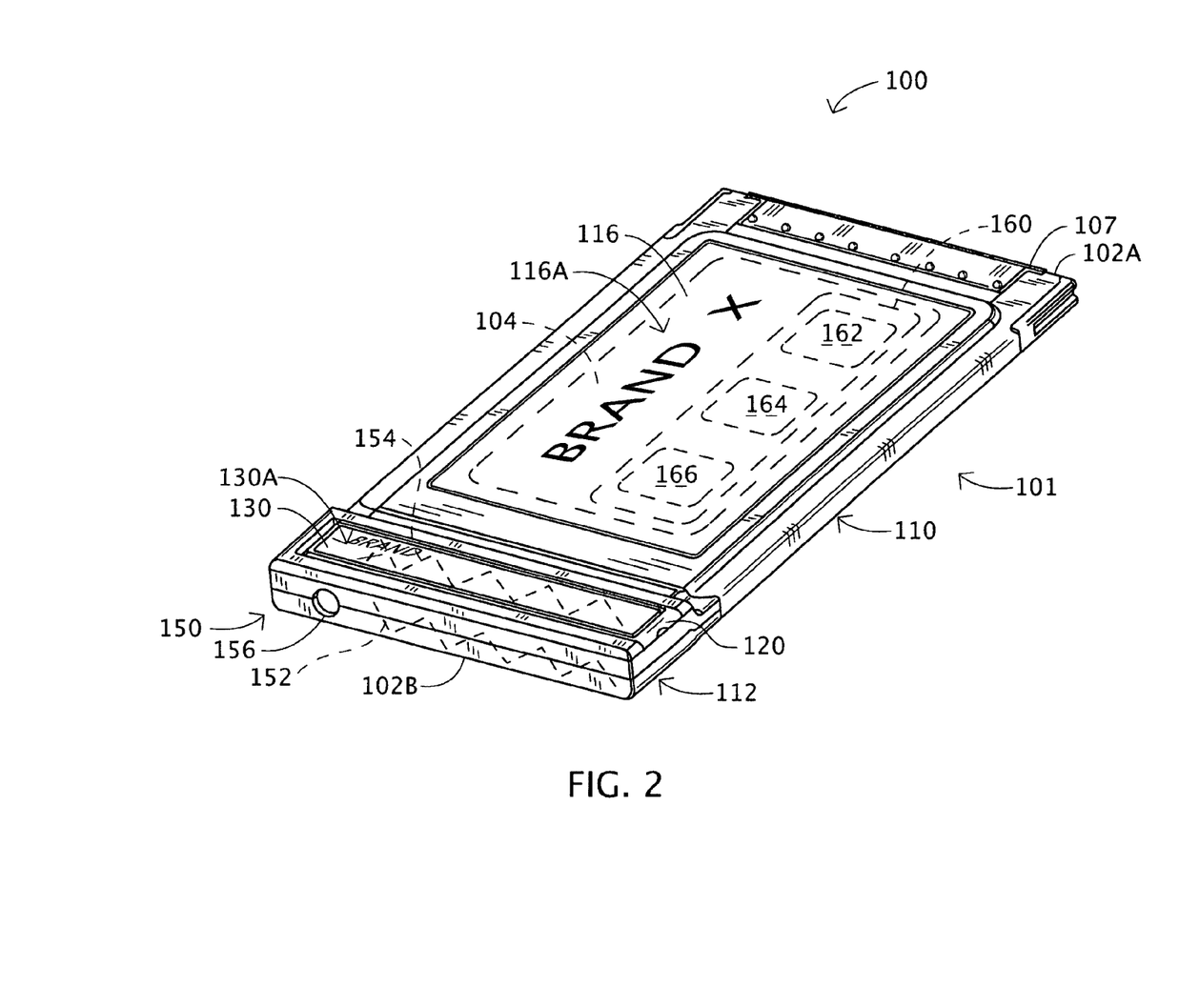
FIG. 2 is a front perspective view of a wireless communications card according to embodiments of the present invention, wherein an extension arm thereof is shown in a retracted position.
Figure 3:
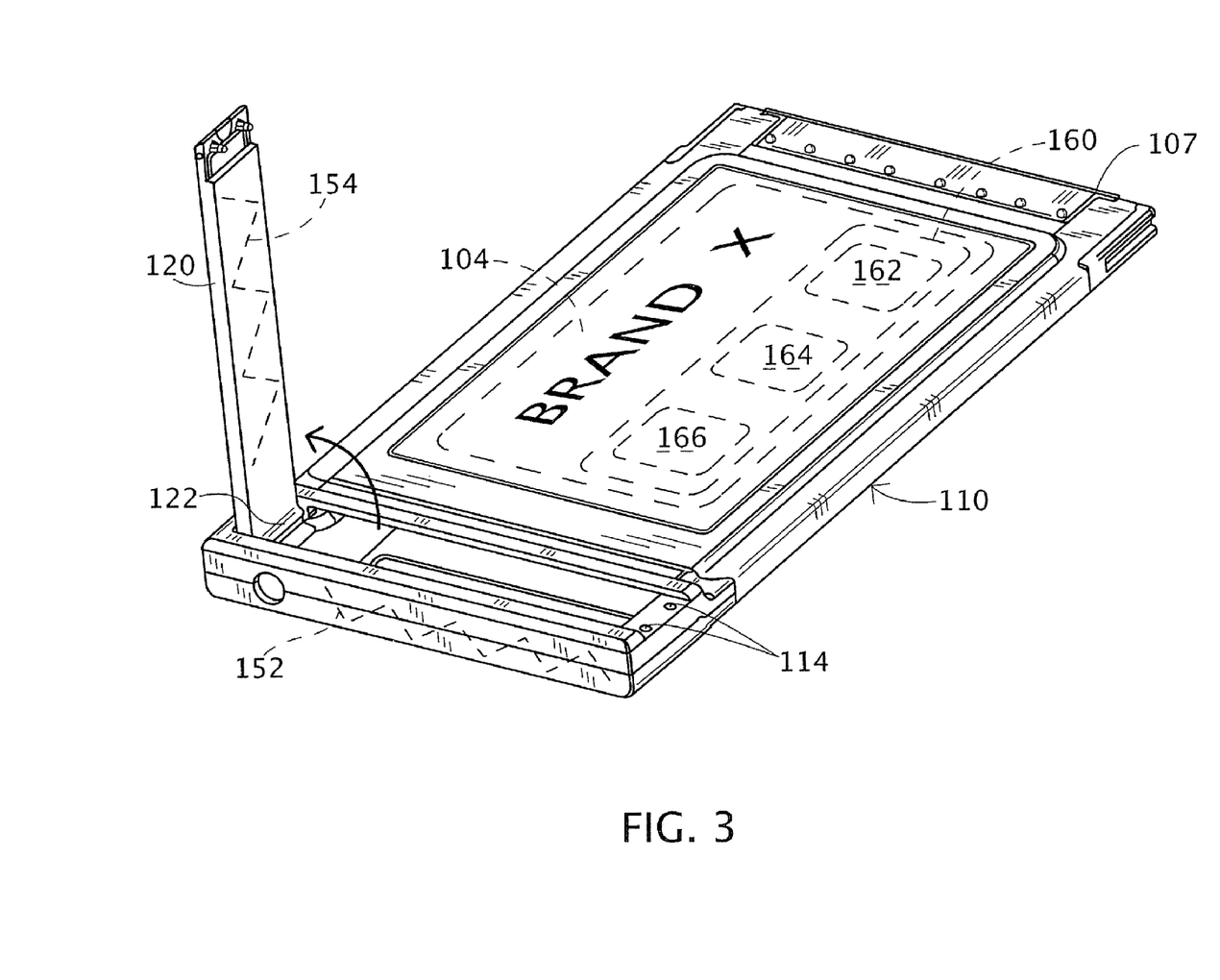
FIG. 3 is a front perspective view of the wireless communications card of FIG. 2, wherein the extension arm thereof is shown in an extended position.
Figure 4:
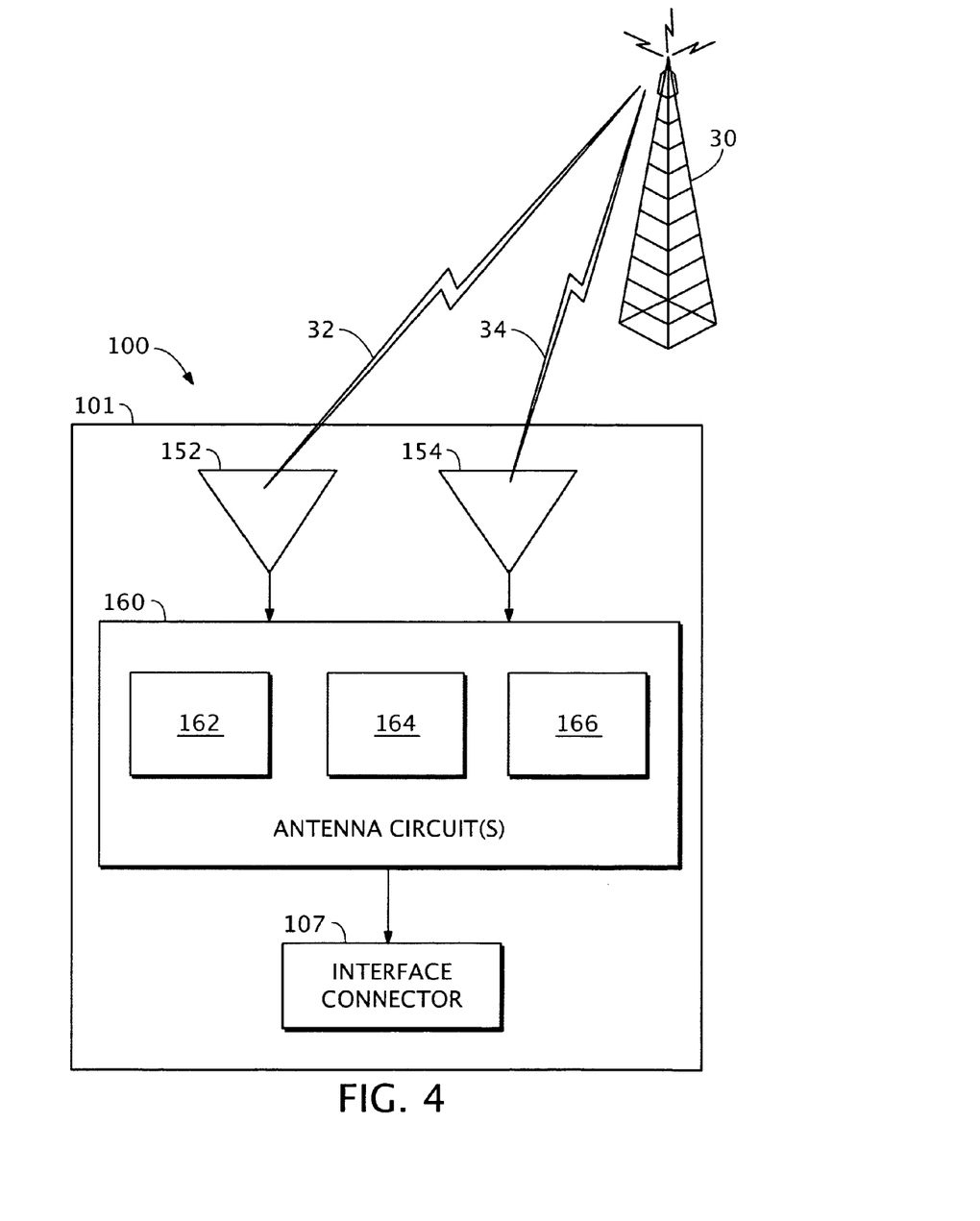
FIG. 4 is a schematic block diagram of the wireless communications card of FIG. 2 and a radio frequency signal source.

The wireless communications card 100 is shown in more detail in FIGS. 2-4. The wireless communications card 100 is a PCMCIA standard compliant PC Card (i.e., the wireless communications card 100 is configured to have a form factor and electrical contact arrangement of a PC Card). The wireless communications card 100 includes a housing or frame 110 extending from a rear end 102A to a front end 102B. The wireless communications card 100 is configured such that, when the wireless communications card 100 is installed in the slot 22, an extension or end frame portion 112 extends outwardly beyond the slot 22 and is exposed while the remainder of the frame 110 is disposed in the slot 22. A printed circuit board (PCB) 104 and a contact or interface connector 107 is mounted in the frame 110. The interface connector 107 is configured to electrically communicatively connect the wireless communications card 100 to the wireless terminal 10 to exchange signals (directly or indirectly) between the antenna circuit(s) 160 and the wireless terminal 10.

An extension member or arm 120 is pivotally coupled to the frame 110 by a hinge mechanism 122 (FIG. 3). The hinge mechanism 122 may have any suitable construction, such as a pin and hole configuration, for example. According to some embodiments, the extension arm 120 is permanently coupled with or secured to the frame 110. The frame 110 and the extension arm 120 together form a housing assembly 101. The extension arm 120 is selectively movable between a retracted (or stowed) position as shown in FIG. 2 and an extended (or deployed) position as shown in FIG. 3. According to some embodiments, the arm 120 can be selectively flipped out into the extended position and flipped back into the retracted position by a user using his or her finger, for example. In the retracted position, the extension arm 120 is received or stowed in a slot or recess 114 (FIG. 3) in the frame 110 to maintain a compact form factor. According to some embodiments, the extension arm 120 extends orthogonally to the width of the frame 110 when in the extended position.

The frame 110 and the extension arm 120 may be formed of any suitable material. According to some embodiments, the frame 110 and/or the extension arm 120 are formed of a plastic or polymeric material.

A label or plate 116 may be secured to the housing and provided with suitable indicia 116A. A label or plate 130 may be secured to the housing and provided with suitable indicia 130A.

An antenna system 150 is mounted on and housed in the frame 110. The antenna system 150 includes a first or main radio antenna 152, a second or secondary radio antenna 154, an external antenna port or connector 156, and one or more antenna circuits 160. According to some embodiments, the antenna circuit(s) 160 are housed in the frame 110 and embodied in the PCB 104. The antenna circuit(s) 160 may include one or more alternative antenna circuits 162, 164, 166 as discussed below, for example. The antenna circuit(s) 160 (including one or more of the antenna circuits 162, 164, 166) may include one or more receivers or transceivers, processing circuitry and/or other suitable circuitry. The external antenna connector 156 is connected to the antenna circuit(s) 160, for example, in known manner for providing connectivity between an external antenna and the antenna circuit(s) of a wireless communications card. According to some embodiments, the antennas 152, 154 are integrated into the wireless communications card 100 as follows.

The main antenna 152 is housed in the end portion 112. The main antenna 152 may be mounted and configured in known manner for integral internal RF antennas in wireless communications cards. As illustrated, the antenna 152 is a serpentine antenna; however, other configurations may be used. Any suitable type of antenna may be used. According to some embodiments, the antenna 152 is an antenna element mounted on a ceramic chip, flex circuit assembly or microstrip.

The secondary antenna 154 is housed in or on the extension arm 120, which serves as a base or carrier for the antenna 154. As illustrated, the antenna 154 is a serpentine antenna; however, other configurations may be used. Any suitable type of antenna may be used. According to some embodiments, the antenna 154 is an antenna element mounted on a ceramic chip, flex circuit assembly or microstrip.

The antennas 152, 154 are each permanently or switchably connected to the antenna circuit(s) 160 as described below, depending on the configuration and intended functionality of the wireless communications card 100. According to some embodiments, the antenna system 150 has first and second operational modes or configurations. The first operational mode is selected or actuated when the extension arm 120 is placed in the retracted position (FIG. 2). The second operational mode is selected or actuated when the extension arm 120 is placed in the extended position (FIG. 3). Switching between the two operational modes may be effected using any suitable mechanism and technique such as the switching mechanism described herein with reference to FIGS. 7-12.

In some embodiments, the antenna 154 is communicatively connected to (or "engaged with") an associated antenna circuit 164 when the extension arm is in the extended position and is disconnected from (or "disengaged from") the associated antenna circuit 164 when the extension arm is in the retracted position. In some such embodiments, the antenna 154 is communicatively connected to a second associated antenna circuit 162 or 166 (different from the first associated antenna circuit) when the extension arm is in the retracted position. According to some embodiments, the first and second alternative associated antenna circuits are alternative impedance matching networks having different impedance matching characteristics from one another. According to some embodiments, the first and second alternative associated antenna circuits are alternative radio frequency circuits configured to receive/send radio signals in different frequency ranges from one another.

According to other embodiments, the antenna 154 communicatively is connected to an associated antenna circuit 164 when the extension arm 120 is in the extended position and is not directly connected to any antenna circuit when the extension arm 120 is in the retracted position. According to some such embodiments, when the extension arm is in the retracted position, the main antenna 152 is connected to the antenna circuit 164 or another antenna circuit 162, and the antenna 154 is a parasitic element that couples to the antenna 152 to tune the antenna 152 to broaden the existing bandwidth of the antenna system 150 or provide functionality in a different band (e.g., GPS band or WLAN band). According to other such embodiments, the antenna 154 is inactive when the extension arm 120 is in the retracted position (i.e., the antenna 154 is not connected to an active antenna circuit and is not operatively coupled to the main antenna 152).

According to some embodiments, when the extension arm 120 is in the extended position, the antennas 152, 154 are each connected to the antenna circuit(s) 160 such that the antenna system 150 forms a diversity antenna system wherein the antennas 152, 154 serve as diversity antennas having different dominant polarizations from one another (i.e., polarization diversity). For example, with reference to FIG. 4, the antennas 152, 154 receive signals from a radio frequency signal source 30 via different respective signal paths 32, 34. In some embodiments, the antenna 152 has a horizontal dominant polarization and the antenna 154 has a vertical dominant polarization so that the antennas 152, 154 have relatively orthogonal polarizations when the arm 120 is raised. The diversity antenna system may be a receive diversity or a selection diversity system, for example.

In some embodiments, the antennas 152, 154 form a diversity antenna system as described above when the extension arm 120 is extended and, when the extension arm 120 is retracted, the antenna 154 couples to the antenna 152 as a parasitic element (e.g., to provide increased bandwidth or functionality in a different band). In some embodiments, when the extension arm 120 is retracted, the antenna 154 is communicatively connected to a radio frequency circuit 164 configured to receive/send radio signals in a different frequency range than a radio frequency circuit 162 to which the main antenna 152 is connected. According to other embodiments, the antenna 154 is inactive when the extension arm 120 is retracted.

In some embodiments, when the extension arm 120 is extended, the antenna 152 is connected to an antenna circuit 162 configured to receive/send radio signals in a first frequency range and the antenna 154 is connected to an antenna circuit 164 configured to receive/send radio signals in a second frequency range different from the first. By way of example, the first frequency range may be a WLAN radio frequency range (e.g., 2400 to 2480 MHz or 5.2 GHz) and the second frequency range may be a cellular telephone transmission radio frequency range (e.g., 824 to 2170 MHz) or a GPS radio frequency range (e.g., 1.5 GHz). In some such embodiments, when the extension arm 120 is retracted, the antenna 154 couples to the antenna 152 as a parasitic element (e.g., to provide increased bandwidth or functionality in a different band). In other embodiments, when the extension arm 120 is retracted, the antenna 154 is connected to a radio frequency circuit 166 configured to receive/send radio signals in a third frequency range different than those of the radio frequency circuits 162, 164. According to other embodiments, the antenna 154 is inactive when the extension arm 120 is retracted. According to some embodiments (which may be combined with each of the embodiments just described), the main antenna 152 remains operatively connected to the antenna circuit 162 when the arm 120 is retracted so that the antennas 152, 154 are simultaneously operational or engaged.

According to further embodiments, the main antenna 152 is connected to the antenna circuit 162 when the arm 120 is retracted and, when arm 120 is extended, the antenna 154 is activated and the antenna 152 is rendered inactive. According to some embodiments, the antenna 154 is activated by connecting the antenna 154 to an antenna circuit 164 configured to receive/send radio signals in a frequency range different from that of the antenna circuit 162. However, according to other embodiments, the antenna 154 may be activated by connecting the antenna 154 to the antenna circuit 162 or another antenna circuit configured to receive/send radio signals in a frequency range the same as that of the antenna circuit 162.

In some such embodiments as just described, when the extension arm 120 is retracted, the antenna 154 couples to the antenna 152 as a parasitic element. According to other embodiments, the antenna 154 is inactive when the extension arm 120 is retracted.

The external connection port 156 may be used to connect an external antenna to the antenna system 150. The external antenna may form a diversity antenna system with the main antenna 152, for example. According to some embodiments, the wireless communications card 100 is configured such that the antenna 154 is disengaged (i.e., operationally disconnected from the antenna system) when an external antenna is connected to the wireless communications card 100 via the external connection port 156.

Figure 5:
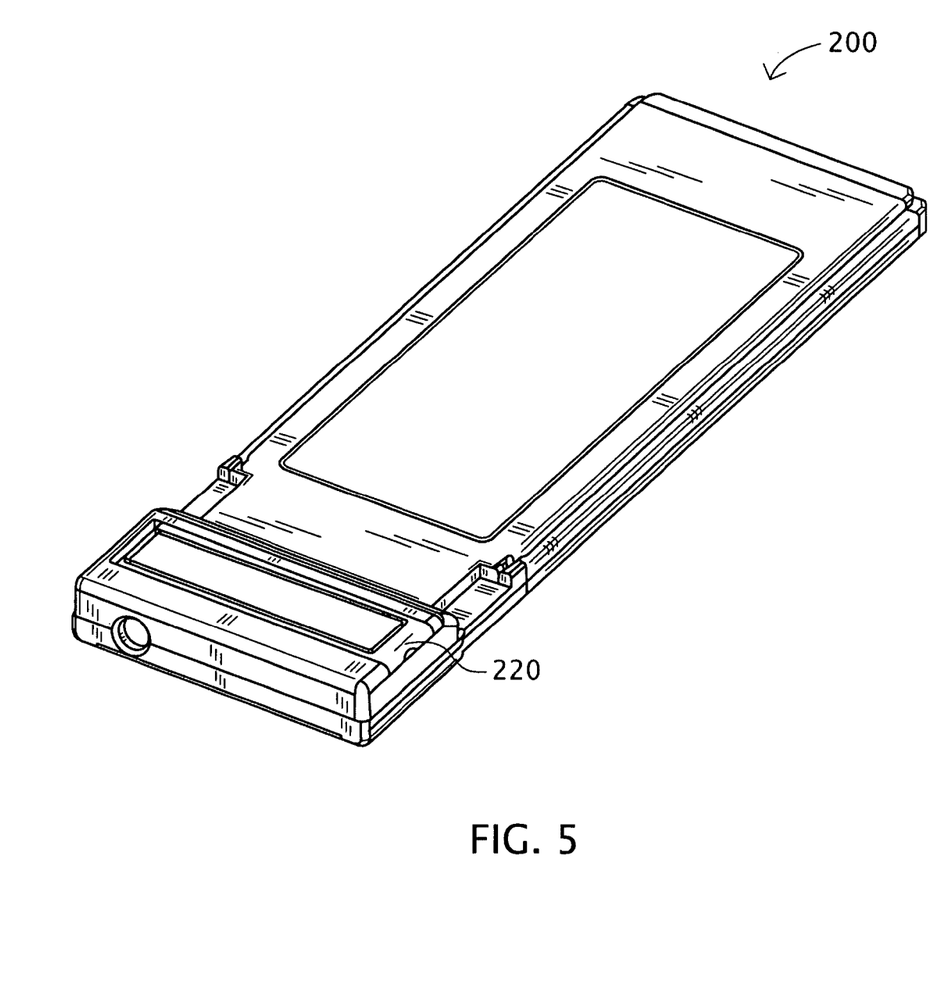
FIG. 5 is a front perspective view of a wireless communications card according to further embodiments of the present invention, wherein an extension arm thereof is shown in a retracted position.
Figure 6:
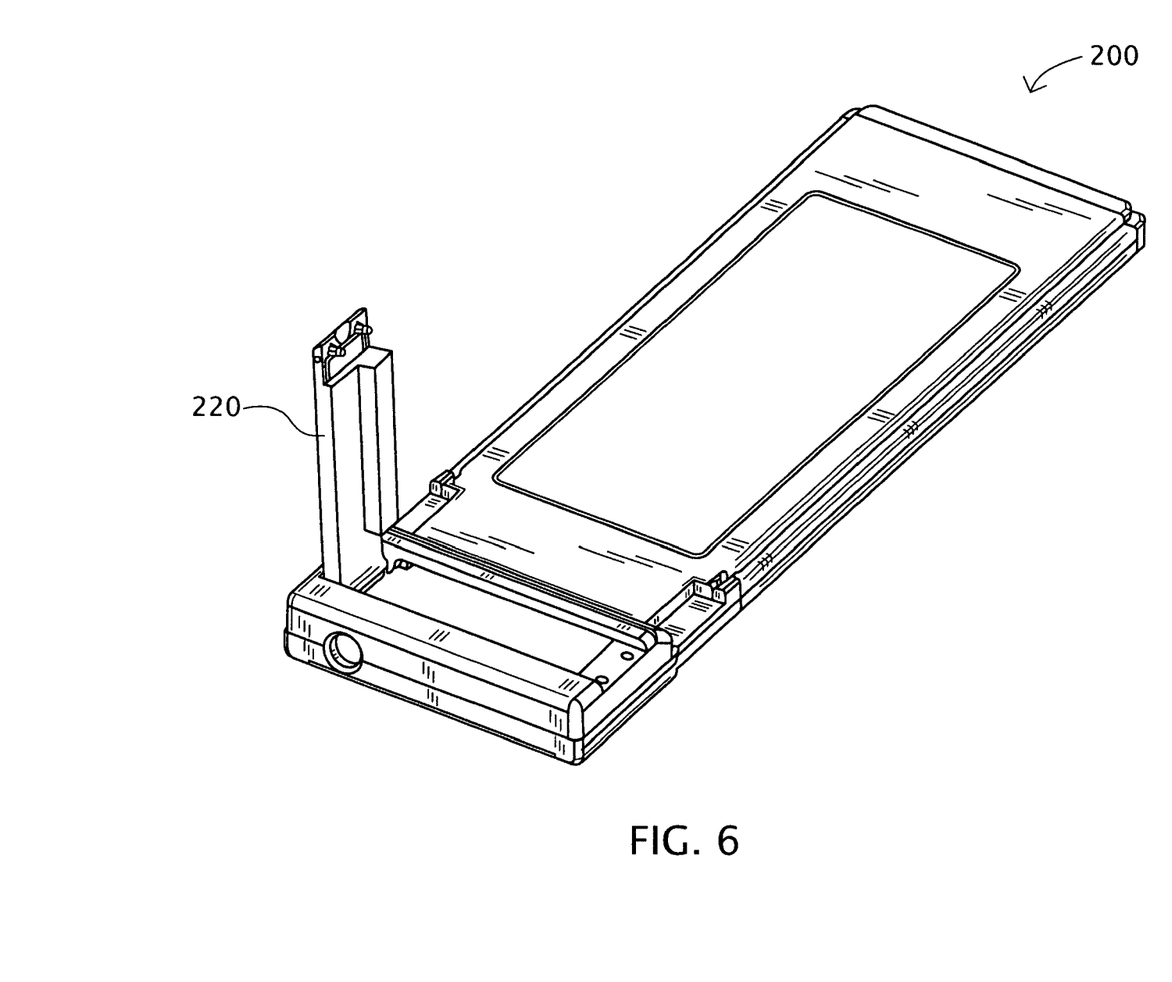
FIG. 6 is a front perspective view of the wireless communications card of FIG. 5, wherein the extension arm thereof is shown in an extended position.

With reference to FIGS. 5 and 6, a wireless communications card 200 according to further embodiments of the present invention is shown therein. The wireless communications card 200 corresponds to the wireless communications card 100 except that the wireless communications card 200 is a PCMCIA standard compliant ExpressCard (i.e., the wireless communications card 200 is configured to have a form factor and electrical contact arrangement of an ExpressCard). FIGS. 5 and 6 and shown an antenna extension arm 220 of the wireless communications card 200 in a retracted position and an extended position, respectively. The wireless communications card 200 may be otherwise configured and operable as discussed above with regard to the wireless communications card 100.

With reference to FIGS. 7-12, a wireless communications card 300 according to further embodiments of the present invention is shown therein. The wireless communications card 300 corresponds to the wireless communications card 100 except as discussed below. The wireless communications card 300 may be otherwise configured and operable as discussed above with regard to the wireless communications card 100. Also, while a PC Card form factor is illustrated for the wireless communications card 300, alternative embodiments may have the form factor and be configured as ExpressCards or proprietary wireless communications cards.

Figure 7:
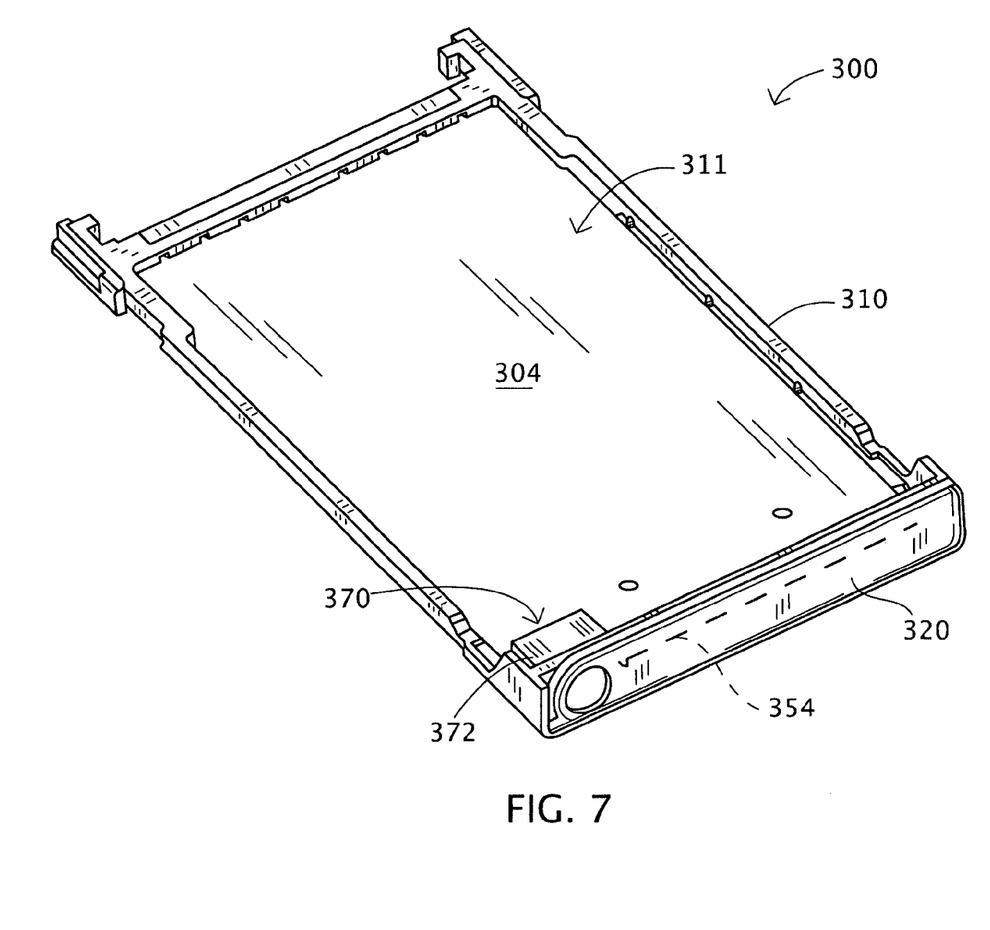
FIG. 7 is a front perspective view of a wireless communications card according to further embodiments of the present invention, wherein an extension arm thereof is shown in a retracted position.
Figure 8:
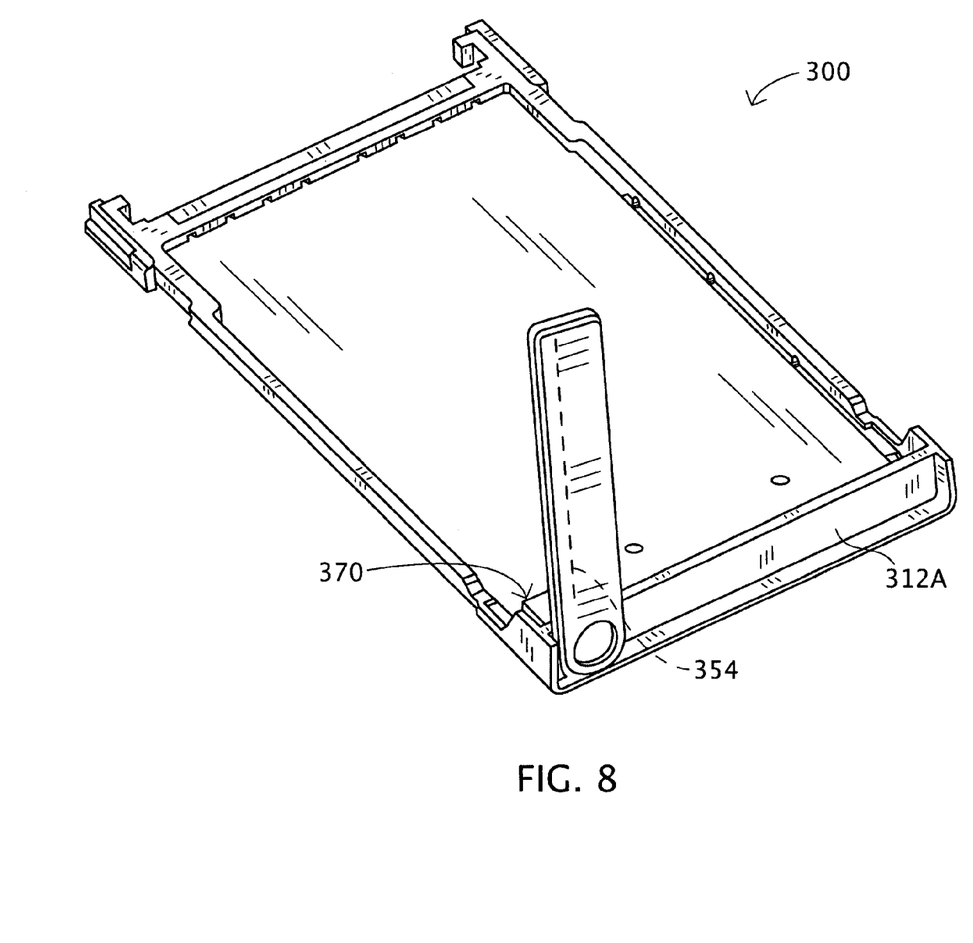
FIG. 8 is a front perspective view of the wireless communications card of FIG. 7, wherein the extension arm thereof is shown in an extended position.
Figure 9:
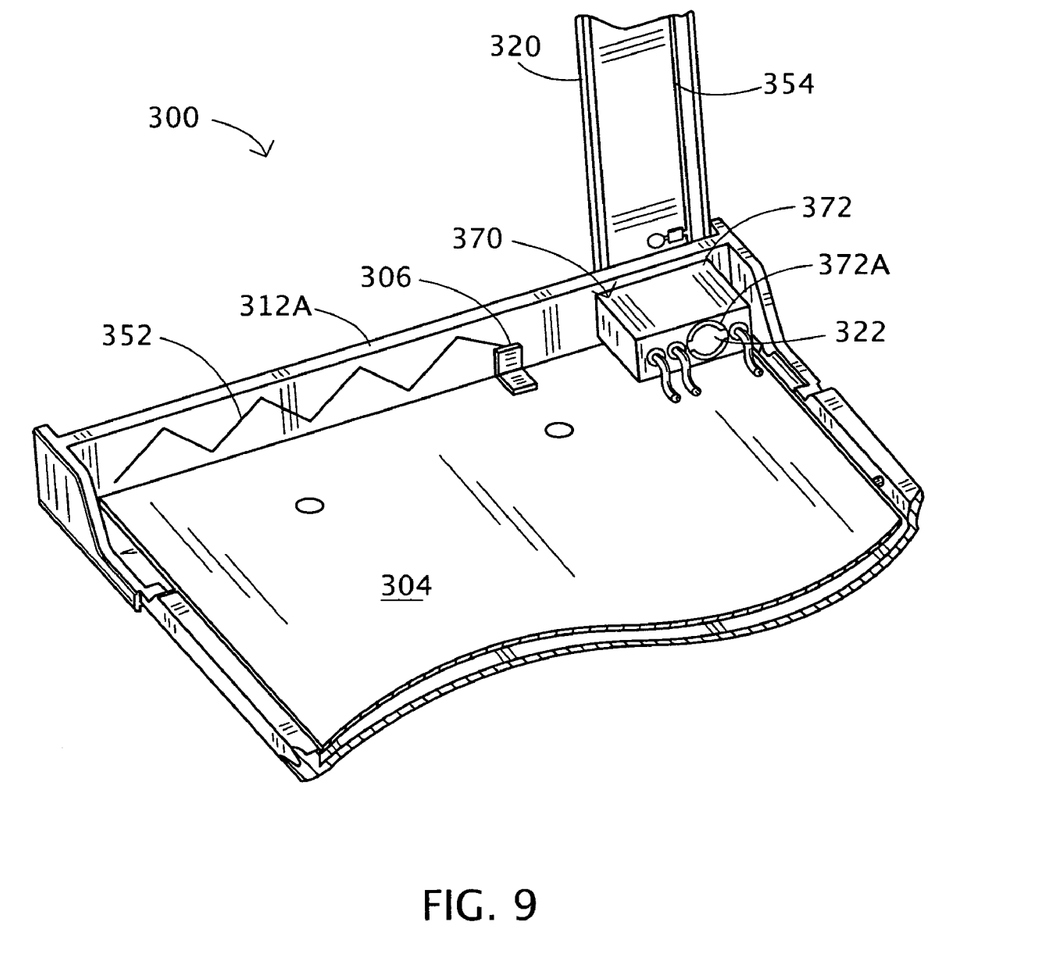
FIG. 9 is an enlarged, fragmentary, rear perspective view of the wireless communications card of FIG. 7, wherein the extension arm thereof is shown in an extended position.

Referring to FIGS. 7-11, the wireless communications card 300 is shown therein with a cover plate removed to reveal a switch assembly 370 and an interior cavity 311 in a frame 310 of the wireless communications card 300 for the purpose of explanation. In practice, the wireless communications card 300 may further include a cover plate to fully enclose the interior cavity 311. A printed circuit board (PCB) 304 corresponding to the PCB 104 is mounted in the interior cavity 311 and includes the antenna circuit(s) as discussed above. The frame 310 has a front wall 312A (FIGS. 8 and 9). A main antenna 352 (FIG. 9) corresponding to the antenna 152 is mounted on the front wall 312A and electrically connected to the PCB 304 and the antenna circuit(s) by a contact 306, for example.

In the wireless communications card 300, the extension arm 120 is replaced with an extension arm 320 that extends vertically widthwise. An antenna 354 corresponding to the antenna 154 is mounted on the arm 320. As shown, the antenna 354 has a linear configuration; however, other configurations may be used. A pivot post 322 is secured to or integrated with the arm 320 on one end and extends through an opening (not shown) in the front wall 312A and an opening 372A in a switch housing 372 (FIG. 9). The wireless communications card 300 is configured such that the arm 320 can be pivoted between a retracted position as shown in FIGS. 7 and 10 and an extended position as shown in FIGS. 8, 9 and 11.

Figure 10:
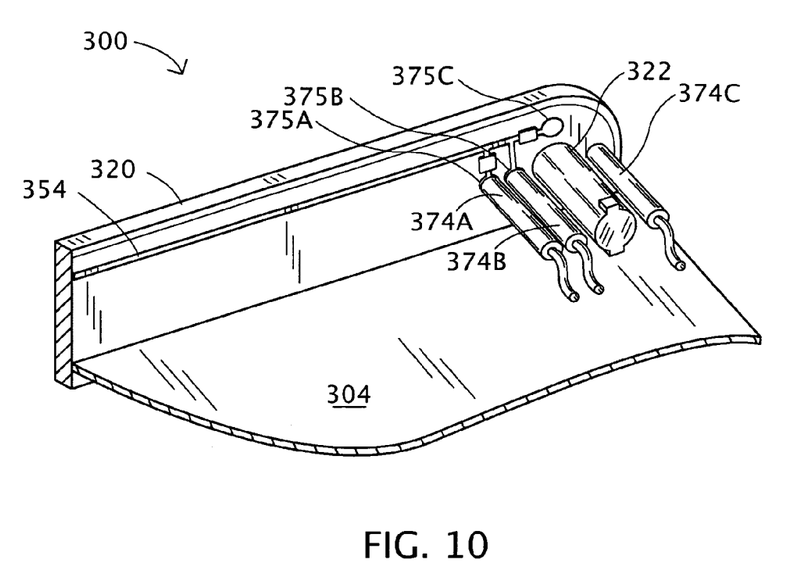
FIG. 10 is a further enlarged, fragmentary, rear perspective view of the wireless communications card of FIG. 7, wherein the extension arm thereof is shown in a retracted position.
Figure 11:
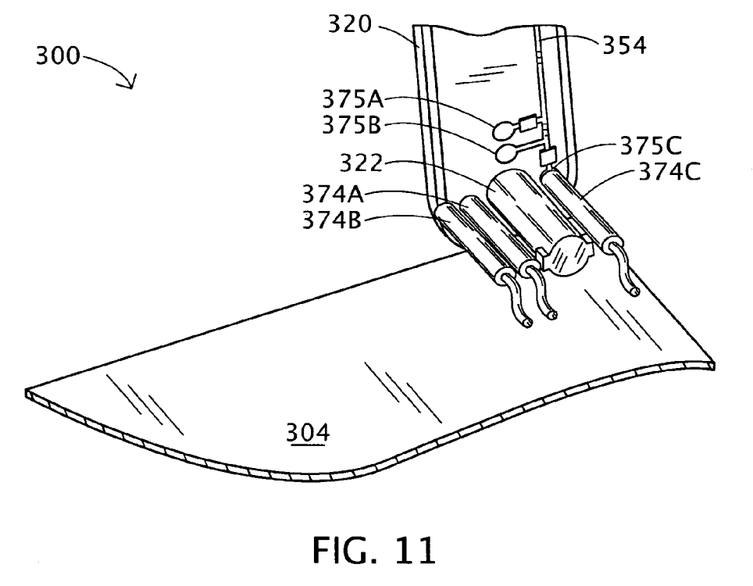
FIG. 11 is an enlarged, fragmentary, rear perspective view of the wireless communications card of FIG. 7, wherein the extension arm thereof is shown in the extended position.
Figure 12:
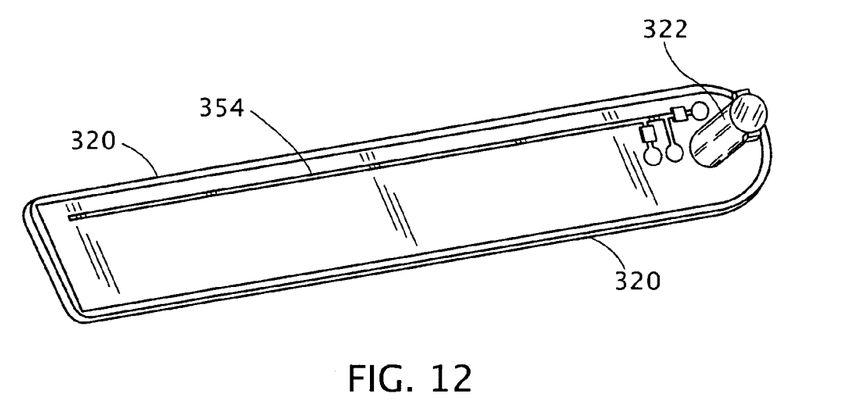
FIG. 12 is a rear perspective view of the extension arm and an antenna of the wireless communications card of FIG. 7.

With reference to FIGS. 10 and 11, the wireless communications card 300 is shown therein with the front wall 312A and the switch housing 372 further omitted for the purpose of explanation. The switch assembly 370 includes the switch housing 372, contact members 374A, 374B, 374C (FIGS. 10 and 11), and contact pads 375A, 375B, 375C. The contact members 374A, 374B, 374C may be pogo pin connectors as shown, or may be any other suitable type or configuration of connectors, such as leaf springs. The contact members 374A, 374B, 374C are secured to the PCB 304 and electrical connected to the antenna circuits thereon. The contact pads 375A, 375B, 375C are secured to the inside surface of the arm 320 and electrically connected to the antenna 354. The contact members 374A, 374B, 374C are biased (e.g., spring loaded) against the arm 320, and thereby against the contact pads 375A, 375B, 375C, when the contact pads are aligned with the contact members 374A, 374B, 374C. The front wall 312A is interposed between the interior cavity 311 and the arm 320; however, a hole or holes (e.g., the same hole that receives the post 322) are configured so that the contact members 374A, 374B, 374C can extend through the wall 312A to contact the contact pads 375A, 375B, 375C.

As shown in FIG. 10, when the arm 320 is in the retracted position, the contact members 374A, 374B engage the contact pads 375A, 375B to provide electrical continuity between the antenna 354 and a first associated antenna circuit. As shown in FIG. 11, when the arm 320 is in the extended position, the contact member 374C engages the contact pad 375C to provide electrical continuity between the antenna 354 and a second associated antenna circuit. Thus, the foregoing switch mechanism may be used to switch the antenna connection between the alternate antenna circuits to provide the alternative functionalities discussed above with regard to the wireless communications card 100. It will be appreciated that the switch mechanism may be modified to enable other combinations of functionalities. For example, the switch mechanism may be configured to disconnect the antenna 354 from all antenna circuits when the arm 320 is in the retracted position.

Thus, in accordance with embodiments of the present invention, a wireless communications card can be provided with both a relatively compact form factor and enhanced or alternative antenna performance. During storage or transport of the wireless communications card or an electronic device (e.g., a notebook computer) within which the wireless communications card is installed, when a lower level of antenna performance is acceptable, or when a first communications band is desired, a user may retain an antenna extension arm (e.g., the arms 120, 220, 330) in its stowed position for a first antenna system configuration or mode. The stowed extension arm may be unobtrusive and may fit smoothly in the overall shape of the wireless communications card and, according to some embodiments, may fit substantially flush with a frame of the wireless communications card. When enhanced or alternative antenna performance is desired, the user can quickly and conveniently transit the extension arm from its stowed position to its extended position to attain a second antenna system configuration or mode. In some embodiments, this movement itself engages and/or disengages the first and second antennas from the associated antenna circuit(s) to effect the appropriate antenna system configuration. The user can quickly and conveniently return the wireless communications card to the first antenna system mode and the compact form factor by moving the extension arm back to the stowed position. According to some embodiments, the switching between modes occur automatically in response to the movement of the extension arm from the retracted position to the extended position and/or vice-versa so that no other action is required of the user.

While, in accordance with some embodiments, the antenna systems described herein are switched between modes by extending and retracting the antenna arms, other configurations may be employed. For example, a combination of movements of the extension arm and another component (e.g., a further arm on which the main antenna is mounted, or a further lever or button) may be required.

Figure 13:
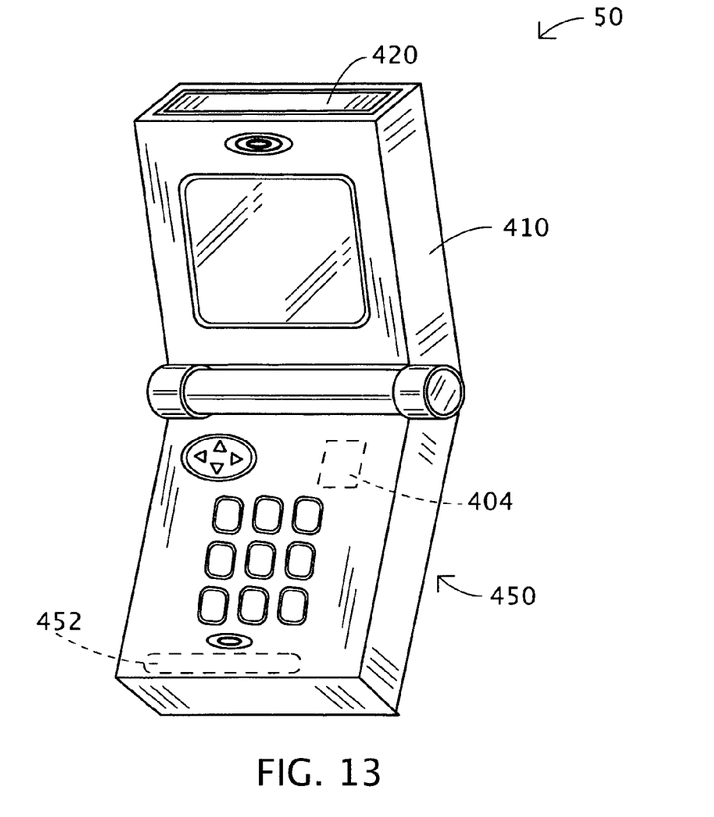
FIG. 13 is a perspective view of a wireless communications terminal according to further embodiments of the present invention, wherein an extension arm thereof is in a retracted position.
Figure 14:
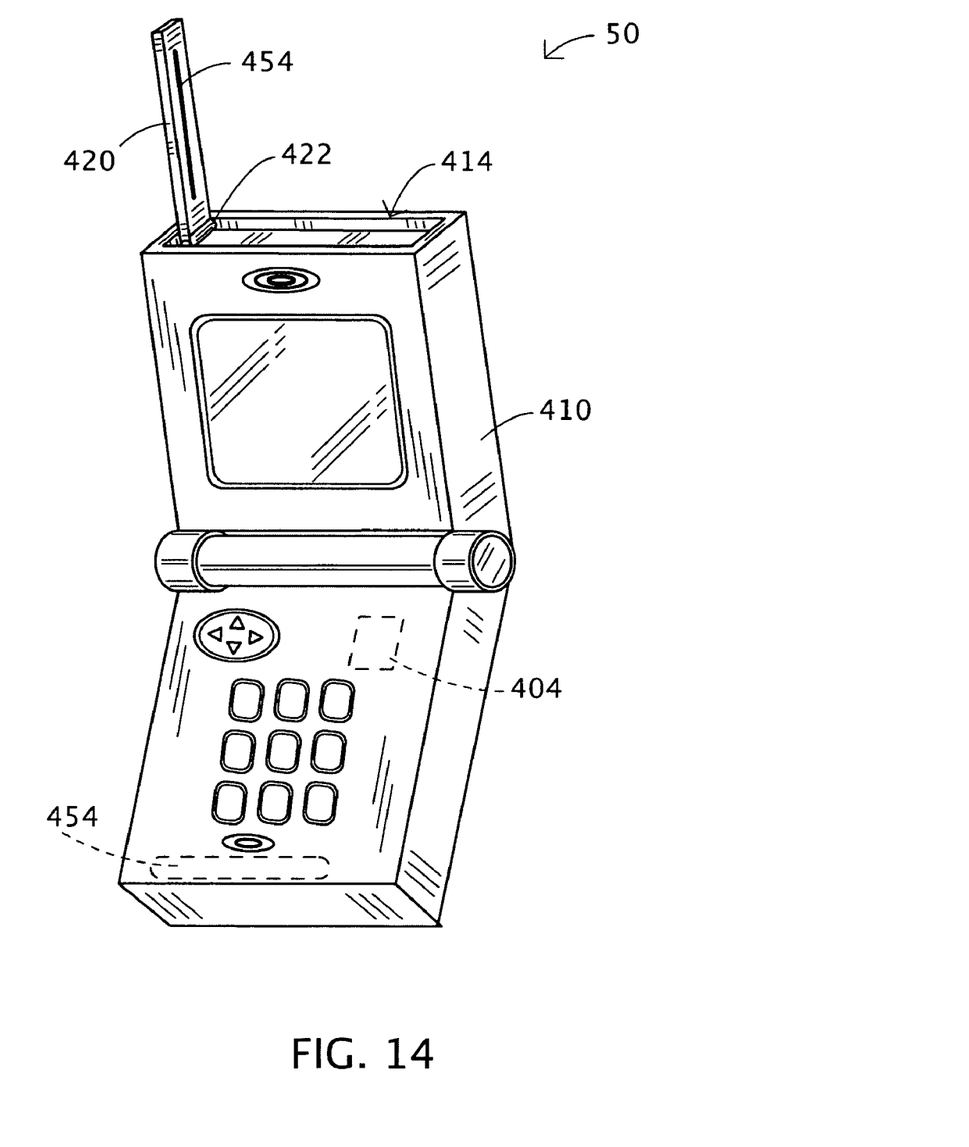
FIG. 14 is a perspective view of the wireless communications terminal of FIG. 13, wherein the extension arm thereof is shown in an extended position.

According to further embodiments of the present invention, the foregoing antenna systems may be integrated into a mobile terminal without the provision of a wireless communications card. With reference to FIGS. 13 and 14, a mobile terminal 50 such as a cellular telephone according to embodiments of the present invention is shown therein. According to some embodiments, the mobile terminal 50 is a handheld mobile terminal. By "handheld mobile terminal," it is meant that the outer dimensions of the mobile terminal are adapted or configured and suitable for use by a typical operator using one hand. According to some embodiments, the total volume of the handheld mobile terminal 50 is less than about 200 cc. According to some embodiments, the total volume of the handheld terminal 50 is less than about 100 cc. According to some embodiments, the total volume of the handheld mobile terminal 50 is between about 50 and 100 cc. According to some embodiments, no dimension of the handheld mobile terminal 50 exceeds about 200 mm.

The mobile terminal 50 includes a housing 410 and an extension arm 420 pivotally mounted on the housing 410 by a hinge mechanism 422 for movement between a retracted position (as shown in FIG. 13) and an extended position (as shown in FIG. 14). A recess 414 may be provided in the housing 410 to receive the arm 420. A PCB 404 corresponding to the PCB 104 is mounted in the housing 410 and includes the antenna circuit(s) as discussed above. A main antenna 452 corresponding to the main antenna 152 is mounted in the housing 410. A secondary antenna 454 corresponding to the antenna 154 is mounted on the arm 420 for movement therewith. The antennas 452, 454 and one or more antenna circuits corresponding to the antenna circuit(s) 160 form an antenna system 450 corresponding the antenna system 150.

The arm 420 can be extended and retracted as discussed above with regard to the wireless communications card 100 to provide and alternate between antenna functionalities or operational modes. The combinations of antenna modes for the antenna system 450 and the antennas 452 and 454 may include any of the combinations as discussed above with regard to the antenna system 150 and the antennas 152, 154. For example, the antenna 454 may be extended (i.e., by moving the arm 420 into its extended position) to form a diversity antenna system wherein the antennas 452, 454 serve as diversity antennas having different dominant polarizations from one another. The antenna system of the mobile terminal 50 may therefore provide advantages as discussed above.

While diversity antenna systems having diverse polarization may be configured in accordance with embodiments of the invention as described above, in accordance with some embodiments, wireless communications cards or terminals in accordance with the present invention may be configured to provide spatially diverse antennas that are or are not polarization diverse.

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims, therefore, are to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

That which is claimed is:

1. A wireless communications card for use with an electronic device, the wireless communications card comprising:
a frame configured for removable installation in the electronic device; and
an antenna system including first and second antennas each integral with the frame, wherein at least one of the first and second antennas is selectively movable relative to the other between a first antenna configuration and a second antenna configuration;
wherein the first antenna is internal to the frame and the second antenna is mounted on an extension member that is movably mounted on the frame such that the extension member and the second antenna can be selectively moved between a retracted position adjacent the frame and a second position extended from the frame.

2. The wireless communications card of claim 1 wherein the extension member is pivotally mounted on the frame for movement between the retracted and extended positions.

3. The wireless communications card of claim 1 wherein, when the extension member is in the retracted position, the extension member and the second antenna are disposed within the frame.

4. The wireless communications card of claim 1 including at least one switch operative to communicatively connect the second antenna to an associated antenna circuit when the extension member is in the extended position and to disconnect the second antenna from the associated antenna circuit when the extension member is in the retracted position.

5. The wireless communications card of claim 4 wherein the at least one switch is operative to communicatively connect the second antenna to a second associated circuit when the extension member is in the retracted position.

6. The wireless communications card of claim 1 wherein movement of the antenna system from the first antenna configuration to the second antenna configuration switches the second antenna from a connection to a first associated antenna circuit to a second associated antenna circuit.

7. The wireless communications card of claim 6 wherein the first and second associated antenna circuits are alternative impedance matching networks.

8. The wireless communications card of claim 6 wherein the first and second associated antenna circuits are alternative radio frequency circuits.

9. The wireless communications card of claim 1 wherein, when the first and second antennas are in the second antenna configuration, the antenna system comprises a diversity antenna system wherein the first and second antennas have different dominant polarizations from one another.

10. The wireless communications card of claim 9 wherein, when the first and second antennas are in the first antenna configuration, the second antenna couples to the first antenna as a parasitic element to broaden a bandwidth of the antenna system.

11. The wireless communications card of claim 9 wherein, when the first and second antennas are in the first antenna configuration, the first antenna is communicatively connected to a first antenna circuit adapted to radiate and/or receive radio signals over a first frequency range and the second antenna is communicatively connected to a second antenna circuit adapted to radiate and/or receive radio signals over a second frequency range different from the first frequency range.

12. The wireless communications card of claim 9 wherein, when the first and second antennas are in the first antenna configuration, the second antenna is inactive.

13. The wireless communications card of claim 1 wherein, when the first and second antennas are in the second antenna configuration, the first antenna is communicatively connected to a first antenna circuit adapted to radiate and/or receive radio signals over a first frequency range and the second antenna is communicatively connected to a second antenna circuit adapted to radiate and/or receive radio signals over a second frequency range different from the first frequency range.

14. The wireless communications card of claim 13 wherein, when the first and second antennas are in the first antenna configuration, the second antenna couples to the first antenna as a parasitic element to broaden a bandwidth of the antenna system.

15. The wireless communications card of claim 13 wherein, when the first and second antennas are in the first antenna configuration, the first antenna is communicatively connected to a third antenna circuit adapted to radiate and/or receive radio signals over a third frequency range different from the first and second frequency ranges.

16. The wireless communications card of claim 13 wherein, when the first and second antennas are in the first antenna configuration, the second antenna is inactive.

17. The wireless communications card of claim 1 wherein, when the first and second antennas are in the second antenna configuration, the second antenna is communicatively connected to an associated active antenna circuit and the first antenna is inactive.

18. The wireless communications card of claim 17 wherein, when the first and second antennas are in the first antenna configuration, the second antenna couples to the first antenna as a parasitic element to broaden a bandwidth of the antenna system.

19. The wireless communications card of claim 17 wherein, when the first and second antennas are in the first antenna configuration, the first antenna is communicatively connected to a first antenna circuit adapted to radiate and/or receive radio signals over a first frequency range and the second antenna is communicatively connected to a second antenna circuit adapted to radiate and/or receive radio signals over a second frequency range different from the first frequency range.

20. The wireless communications card of claim 17 wherein, when the first and second antennas are in the first antenna configuration, the second antenna is inactive.

21. The wireless communications card of claim 1 wherein the wireless communications card is at least one of a wireless communications PC Card and a wireless communications ExpressCard.

22. A mobile wireless communications terminal comprising:
  a housing; and
  an antenna system including first and second antennas each integral with the housing, wherein at least one of the first and second antennas is selectively movable relative to the other between a first antenna configuration and a second antenna configuration;
  wherein the first antenna is internally mounted on the housing and the second antenna is mounted on an extension member that is movable mounted on the housing such that the extension member and the second antenna can be selectively moved between a retracted position adjacent the housing and a second position extended from the housing.

* * * * *